United States Patent
Rausch et al.

(10) Patent No.: US 9,741,385 B1
(45) Date of Patent: Aug. 22, 2017

(54) DIGITAL AUTOMATIC POWER CONTROL

(71) Applicant: Seagate Technology LLC, Cupertino, CA (US)

(72) Inventors: Tim Rausch, Farmington, MN (US); Todd Michael Lammers, Lafayette, CO (US); Robert Matousek, Berthoud, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/052,477

(22) Filed: Feb. 24, 2016

Related U.S. Application Data (63) Continuation-in-part of application No. 15/045,207, filed on Feb. 16, 2016.

(51) Int. Cl.
| | |
|---|---|
| *G06F 7/12* | (2006.01) |
| *G11B 7/1263* | (2012.01) |
| *G11B 5/09* | (2006.01) |
| *G11B 20/10* | (2006.01) |
| *G11B 5/00* | (2006.01) |

(52) U.S. Cl.
CPC .............. *G11B 7/1263* (2013.01); *G11B 5/09* (2013.01); *G11B 20/10037* (2013.01); *G11B 2005/0021* (2013.01)

(58) Field of Classification Search
CPC ..... G11B 7/1263; G11B 7/1267; G11B 7/126; G11B 7/125
See application file for complete search history.

(56) References Cited

U.S. PATENT DOCUMENTS

| | | | |
|---|---|---|---|
| 4,542,986 A | 9/1985 | Berdanier | |
| 4,561,775 A | 12/1985 | Patrick | |
| 4,569,591 A | 2/1986 | Ford | |
| 4,733,961 A | 3/1988 | Mooney | |
| 4,803,497 A * | 2/1989 | Kennedy, Jr. | ........... B41B 19/00 |
| | | | 347/246 |
| 5,093,660 A | 3/1992 | Beauducel | |
| 5,218,630 A * | 6/1993 | Patsiokas | ............ H04W 72/085 |
| | | | 455/450 |
| 5,235,575 A | 8/1993 | Han | |
| 5,568,464 A * | 10/1996 | Horie | ...................... G11B 7/126 |
| | | | 369/116 |
| 5,668,470 A | 9/1997 | Shelor | |
| 5,726,821 A | 3/1998 | Cloke et al. | |
| 6,072,761 A * | 6/2000 | Tani | ................... G11B 11/10595 |
| | | | 369/116 |
| 6,122,127 A | 9/2000 | Flinsbaugh | |
| 6,288,863 B1 | 9/2001 | Flinsbaugh | |
| 6,532,391 B1 | 3/2003 | Nayler | |

(Continued)

*Primary Examiner* — Farley Abad
(74) *Attorney, Agent, or Firm* — Cesari & Reed LLP; Kirk A. Cesari; Christian W. Best (57) ABSTRACT

Systems and methods of digital automatic power control are presented. A preamplifier circuit may include a digital-to-analog converter (DAC) circuit to sample a power signal, such as a from a laser power monitor. The preamplifier may store the sample in an internal preamplifier memory. The sample may be utilized to update a current output of the preamplifier that affects the power signal. These systems and methods may be particularly useful for lasers and heat-assisted magnetic recording (HAMR), which may be utilized during a read mode or a write mode of a HAMR data storage device.

21 Claims, 5 Drawing Sheets

(56) References Cited

U.S. PATENT DOCUMENTS

| | | |
|---|---|---|
| 6,904,475 B1 | 6/2005 | Fairman |
| 7,221,305 B2 | 5/2007 | Kim |
| 7,787,206 B2 | 8/2010 | Yen |
| 7,881,000 B2 | 2/2011 | Lee |
| 8,441,909 B1 * | 5/2013 | Thayamballi ............ G11B 5/40 360/59 |
| 8,711,502 B1 | 4/2014 | Wilson et al. |
| 2002/0176156 A1 * | 11/2002 | Zahnley ............... H04B 10/077 359/341.4 |
| 2003/0185260 A1 * | 10/2003 | Seo ........................ G11B 7/126 372/38.02 |
| 2005/0276178 A1 * | 12/2005 | Nishimura ........... G11B 7/0053 369/44.34 |
| 2006/0083136 A1 * | 4/2006 | Lee ...................... G11B 7/1263 369/47.52 |
| 2007/0096013 A1 | 5/2007 | Sugimoto |

* cited by examiner

DIGITAL AUTOMATIC POWER CONTROL

CROSS REFERENCE TO RELATED APPLICATIONS

The present application claims priority to, and is a continuation-in-part of, pending U.S. patent application Ser. No. 15/045,207, filed Feb. 16, 2016, entitled "ASSIGNABLE REGISTERS ON A PREAMP CHIP", the contents of which is incorporated herein in its entirety.

SUMMARY

In some embodiments, a device can comprise a preamplifier circuit including a memory register, a first input to receive an analog laser power signal corresponding to a laser, a data converter circuit configured to convert the analog laser power signal into a digital sample and store the digital sample in the memory register, and a control circuit. The control circuit can be configured to determine an adjustment of a laser current that powers the laser based on the digital sample, and apply the adjustment to change a power setting of the laser.

In some embodiments, a device can comprise a laser power monitor configured to generate an analog laser power signal based on an output of a laser, a preamplifier circuit, and a control circuit. The preamplifier circuit can include a first input to receive the analog laser power signal from the laser power monitor and a data converter circuit configured to convert the analog laser power signal into a digital sample. The control circuit can be configured to determine an adjustment of a laser current that powers the laser based on the digital sample, and apply the adjustment to change a power setting of the laser.

In some embodiments, a method can comprise implementing an automatic power control of a laser including digitally sampling an analog laser power signal from a laser power monitor during a first period the laser is in a powered on state, automatically determining, via a preamplifier circuit, an adjustment of a laser current that powers the laser based on the digital sampling, and applying the adjustment to the laser current during a second period the laser is in a powered on state.

DETAILED DESCRIPTION

In the following detailed description of the embodiments, reference is made to the accompanying drawings which form a part hereof, and in which are shown by way of illustrations. The features of the various embodiments and examples described herein may be combined, exchanged, removed, other embodiments utilized, and structural changes made without departing from the scope of the present disclosure.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

In accordance with various embodiments, dedicated hardware implementations including, but not limited to, application specific integrated circuits, programmable logic arrays, and other hardware devices can be constructed to implement the methods and functions described herein. Further, the methods and functions described herein may be implemented as a device, such as a memory device, including instructions that when executed cause a processor to perform the methods.

Figure 1:
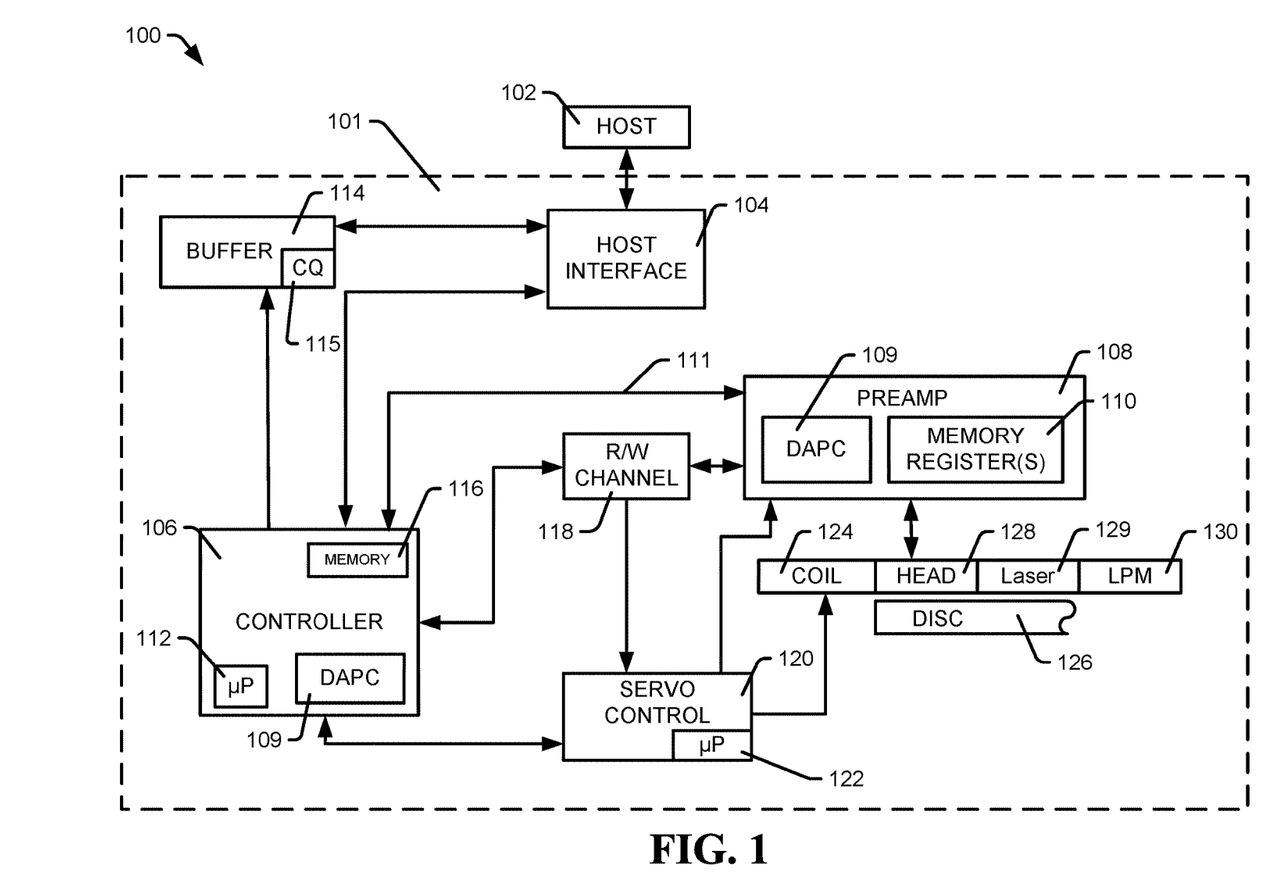
FIG. 1 is a block diagram of a system of digital automatic power control, in accordance with certain embodiments of the present disclosure.

Referring to FIG. 1, a diagram of a system for digital automatic power control is shown and generally designated 100, in accordance with certain embodiments of the present disclosure. Specifically, FIG. 1 provides a functional block diagram of an example data storage device (DSD) 101 and host 102. The DSD 101 may be a hard disc drive (HDD), a hybrid storage device, an optical storage device, or other type of storage device.

The DSD 101 can include one or more data storage mediums, such as one or more disc(s) 126, which can be a magnetic disc or an optical disc for data storage. Further, multiple discs may be included, and each storage surface of the discs 126 may have a respective laser emitter 129 and write head 128 that allow storage of data to the respective surface. In some embodiments, the DSD 101 may be a heat-assisted magnetic recording (HAMR) device that utilizes the laser emitter 129 to heat an area of the disc 126 while the head 128 is writing data to the heated area. Further, a surface of the DSD 101 may include multiple tracks for data storage, where each track is divided into multiple data sectors and multiple servo wedges.

In some embodiments, the DSD 101 can communicate with a host device 102 via a hardware and firmware-based interface circuit 104. The interface 104 may comprise any interface that allows communication between a host 102 and a DSD 101, either wired or wireless, such as Universal Serial Bus (USB), IEEE 1394 (Institute of Electrical and Electronics Engineers standard 1394), Compact Flash, Serial AT Attachment (SATA), external SATA (eSATA), Parallel ATA (PATA), Small Computer System Interface (SCSI), Serial Attached SCSI (SAS), Peripheral Component Interconnect Express (PCIe), Fibre Channel, Ethernet, or Thunderbolt, among others. The interface 104 may include a connector (not shown) that allows the DSD 101 to be physically removed from the host 102. In some embodiments, the DSD 101 may have a casing or housing containing the components of the DSD 101, or the components of the DSD 101 may be attached to the housing, or a combination thereof.

The DSD 101 may include a buffer 114, which may be volatile or nonvolatile memory, and a command queue 115, where the buffer 114 can temporarily store data during read and write operations, and the command queue (CQ) 115 can temporarily store multiple operations pending execution. Commands arriving over the interface 104 may automatically be received in the CQ 115 or may be stored there by controller 106, interface 104, or another component.

The DSD 101 can include a programmable controller 106, which can include associated memory 116 and processor 112. In some embodiments, the DSD 101 can include a read-write (R/W) channel 118, which can encode data during write operations and reconstruct user data retrieved from a memory, such as disc(s) 126, during read operations. A preamplifier circuit (preamp) 118 can apply write currents to the head(s) 128 and provides pre-amplification of read-back signals to the R/W channel 118. A servo control circuit 120 may use servo data to provide an appropriate current for the coil 124, which may be a voice coil motor (VCM), to position the head(s) 128 over a desired area of the disc(s) 126. The controller 106 can communicate with a processor 122 to move the head(s) 128 to the desired locations on the disc(s) 126 during execution of various commands, such as from the command queue 115.

Generally, during operation of the DSD 101 in a HAMR mode, the head can write data to data sectors while the laser 129 is powered on. However, the writer of the head 128 and the laser 129 must be powered off when they cross over each servo wedge and inter sector gap (ISG) to prevent overwriting of the servo information. During use of the laser 129, the emitted power may fluctuate based on various conditions such as amount of time the laser 129 is on, relative temperature, other environmental conditions, other factors, or any combination thereof. In a HAMR based recording device and other laser devices, the laser power can change relative to environmental conditions and can drift (i.e. exhibit changing variances in output power) over the laser lifetime. Specifically, heat can change the lasers threshold point (turn on) and the slope efficiency. To counteract this, a laser power monitor circuit 130 can be utilized to measure the power output of the laser 129 by providing an analog signal representative of such to the preamp 108. Then, a laser current provided from the preamp 108 to the laser 129 can be varied to provide a consistent laser output power. In some embodiments, the laser power monitor circuit 130 may include a photodiode configured to generate a signal representative of the laser output power. Further, a bolometer or a write coil or other resistive elements can provide a power feedback that is representative of the power or voltage of the laser, such as the power at a recoding surface.

In a HAMR device, when a change to the laser power occurs, the system 100 may choose to change a heater value (i.e. clearance) of the write element, which may be done via the circuit(s) in the preamp 108. Generally, a write element of the head 128 has a spacing between the element and the disc that may be changed by shifts in the protrusion of the write element. In response to a changing laser power, the protrusion position may need to be changed, via changing the writer heater value or the read heater value, to update the spacing between the write element and the disc 126. The head 128 may include a heating element capable of changing the protrusion of the write element based on the writer heater value. Further, spacing updates between a read or write element and the disc may be accomplished by making adjustments to a read heater element.

The preamp 108 may include a digital automatic power control (DAPC) 109, which can receive the analog signal representative of the output laser power and determine appropriate adjustments or actions to take based on such. The DAPC 109 may be hardware circuit based, such as an integrated circuit within the preamp 108, or may be firmware based, such as a controller circuit or processor in combination with instructions to perform the functions described, or may be a combination of hardware circuits and firmware. In some embodiments, the DAPC 109 may be at least partially located in the controller 106. Example embodiments of a preamp system with a DAPC 109 are provided in FIG. 2.

Figure 2:
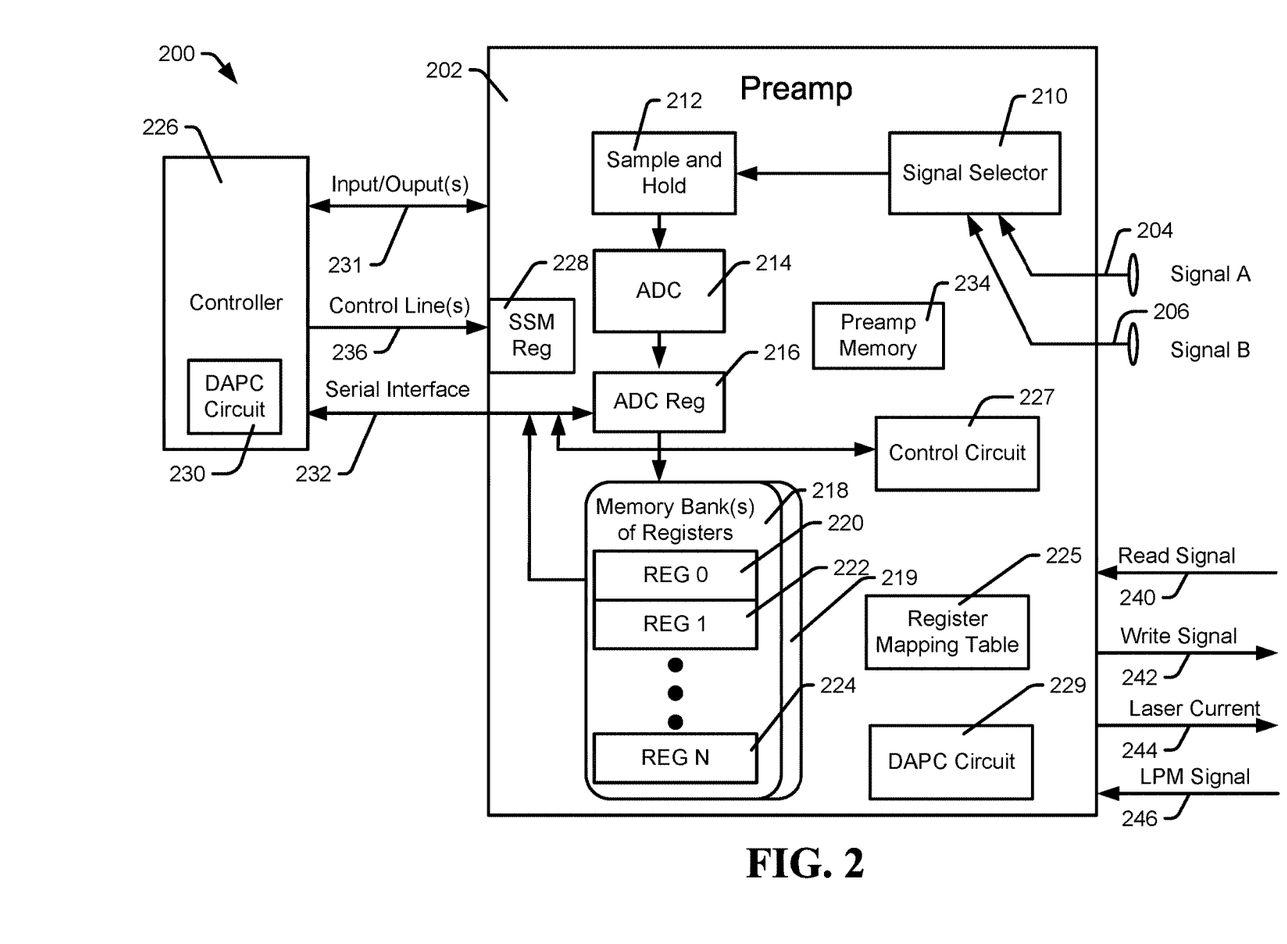
FIG. 2 is a block diagram of a system of digital automatic power control, in accordance with certain embodiments of the present disclosure.

Referring to FIG. 2, a block diagram of a system for digital automatic power control is shown and generally designated 200. The system 200 can include a preamplifier ("preamp") circuit 202 and a controller circuit 226. The controller 226 may be a data storage controller, processor, read/write channel, system-on-chip ("SOC"), application specific integrated circuit ("ASIC") or other device. The preamp circuit 202 can include a signal selector circuit 210 (e.g. digital multiplexer circuit(s)), sample and hold circuit 212, data converter circuit (e.g. analog to digital converter ("ADC")) 214, an ADC reserved register 216, programmable control register(s) 228, register mapping table 225, a memory 234, and a memory bank of registers 218. The preamp 202 may optionally include other memory banks of registers, such as the memory bank of registers 228. The memory 234 may be dynamic random access memory ("DRAM"), assignable or dedicated registers, other memory, or any combination thereof.

The memory bank of registers 218 may be a virtual grouping of assignable memory contained in the preamp 202 that are assigned to store digital values produced by the ADC 214. Thus, the assignment of registers can create a cache to store ADC sampling data within the preamp circuit itself. The assignable memory may be assignable portions of DRAM, assignable registers, or other memory. The memory bank of registers 218 may be referred to as a preamp cache. Assignable registers may be registers that can be assigned to store data for different functions or operations. The memory bank of registers 218 can include multiple registers such as register zero 220, register one 222, through register N 224.

The controller 226 may send or receive signals, such as signal sample acquisition signals, power on/off signals, or other signals to the preamp 202 via input/output lines 231, control line(s) 236, or by a serial interface 232. Further, the controller 226 may determine which registers or bits may be assigned to the memory bank of registers 218, and may have prior knowledge of which registers or bits in the preamp 202 are assignable. The controller 226 may set (or clear) a control bit(s) to assign selected registers to store ADC samples, thus creating the logical grouping of registers 218.

The methods and functions described herein may be performed by a control circuit 227 or a DAPC control circuit 229, either of which may include programmable logic, hardware gates, a controller, or other circuits that allow the system operations to be performed. For example, the memory control circuit 227 may control the digitization of a selected signal and the storing of the resulting digital samples. Further, the DAPC control circuit 229 may perform automatic power control (APC) of a laser (or other power regulated device) based on digitally sampling one or more of the analog input signals. Even further, in some embodiments, the controller 226 can include a DAPC circuit 230 to perform the functions described herein, or the functions may be split between the controller 226 and the preamp DAPC circuit 229.

During operation, the signal selector 212 can route a selected signal representing a laser power output to the sample and hold circuit 214. For example, the signal selector 212 may be directed to select which of the Signal A 204 or Signal B 206 is digitally sampled based on instructions (e.g. control lines) from the controller 226 or the control circuit 227. The controller 226 can set or clear one or more bits in a control register to program the signal selector circuit 212. The sample and hold circuit 214 can acquire a sample of the selected signal at a point in time. The signal sample may be provided to the ADC 214 where it can be digitized into a digital value and stored into the ADC reserved register 216.

In some embodiments, each digital sample from the ADC 214 may be moved to the memory bank of registers 218 and stored for analysis. In some instances, an adjustment or difference value based on the digital sample and a target value may be stored in a register for later use. Such adjustment or difference value may be calculated by the DAPC circuit 229 or the controller's DAPC circuit 230.

If the DAPC circuit 229 is performing calculations or analysis, the DAPC circuit 229 may acquire some or all of the digital values in the ADC reserved register 216 and in the memory bank of registers 218. The DAPC circuit 229 may perform signal analysis or other calculations on the selected signal based on the digital values, such as to determine an adjustment to an output current of the preamp 202. The DAPC circuit 229 may then set or program a new setting of the preamp 202 based on the adjustment.

If the controller 226 is performing calculations or analysis, the controller 226 may acquire some or all of the digital values in the ADC reserved register 216 and in the memory bank of registers 218 via a serial interface 232. Once the controller 226 has received the sample(s) from the preamp 202, the DAPC circuit 230 may perform signal analysis or other calculations on the selected signal based on the digital values. The controller 226 may then program a new setting, such as a laser current output setting, to the preamp 202 based on the analysis of the digital sample(s).

Figure 3:
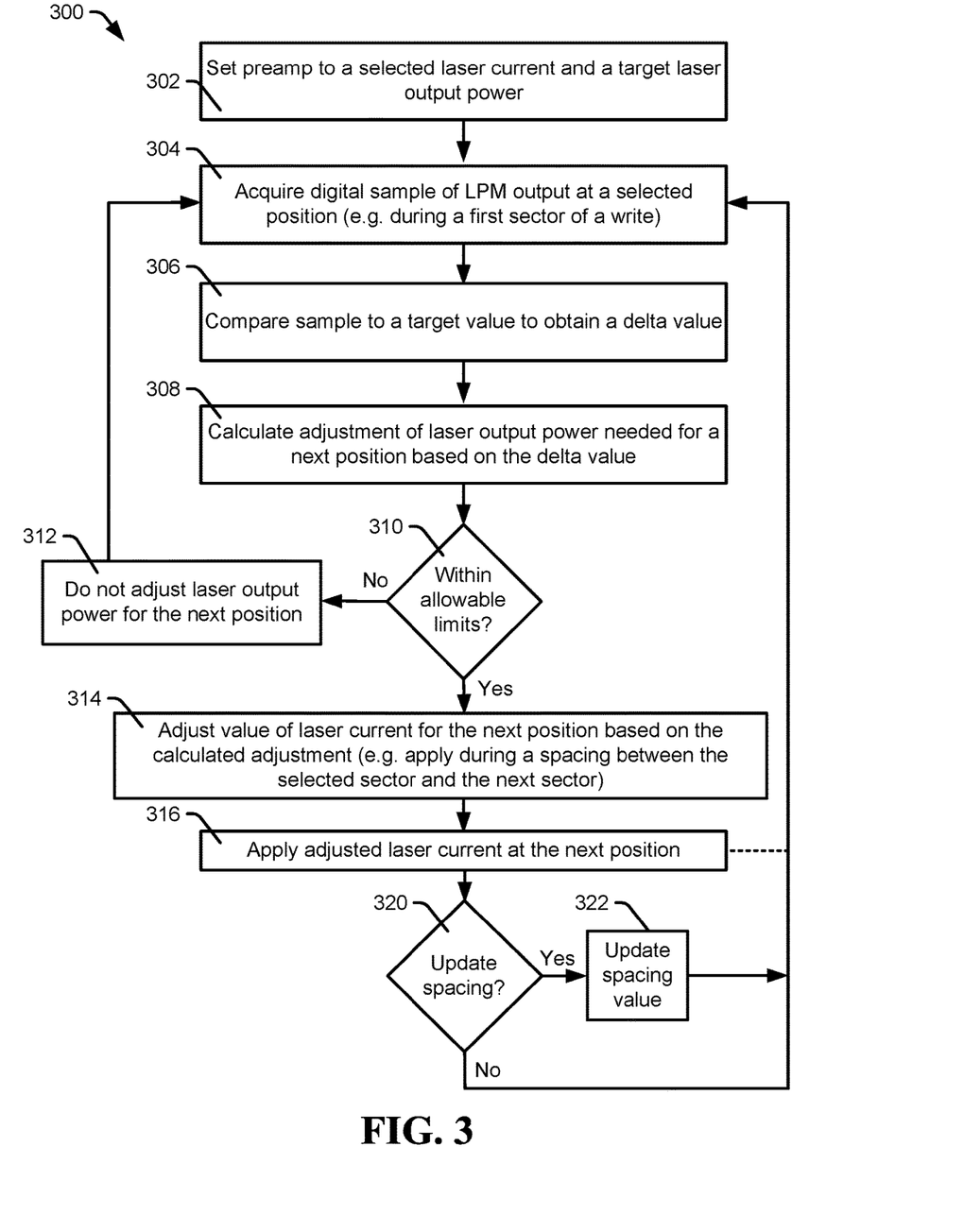
FIG. 3 is a flowchart of a method of digital automatic power control, in accordance with certain embodiments of the present disclosure.

Referring to FIG. 3, a flowchart of a method of digital automatic power control is shown and generally designated 300, in accordance with certain embodiments of the present disclosure. The method 300 may be performed by the systems 100 or 200, which can be achieved within a preamp circuit or controlled externally by firmware of a controller, or via a combination thereof. Method 300 may include setting or programming a preamplifier (e.g. preamp 108 or 202) to a selected laser current and a target laser output power, at 302. For example, a controller (e.g. controller 106 or 226) can be configured to program register settings of the preamp to indicate the selected laser current and the target laser power. The selected laser current may be utilized by the preamplifier as an initial setting to determine an initial laser current to provide at a current output of the preamp for a laser. The target laser power may be set relative to a laser power monitor (e.g. laser power monitor 130) voltage target.

The method 300 may also include acquiring a digital sample of a power monitor output at a selected position (e.g. during a first sector of a write), at 304. Then, the digital sample may be compared to a target value to obtain a delta value, at 306, and an adjustment of an output current for a next position can be determined based on the delta value, at 308. The adjustment can be calculated using a predetermined lookup table or slope value stored in a preamp register for the transfer function between the power monitor and the current output.

Before the adjustment is applied, the method 300 may be determine whether the adjustment will cause the output current to be within acceptable limits or within a specific value range, at 310. There may be a set maximum threshold, minimum threshold, or both for the output current to be set at. Also, there could be a maximum limit or minimum limit, or both, set for the amount of each adjustment. If the adjustment does not keep the output current within the acceptable limits or the adjustment itself is not within acceptable limits, it may be discarded and the previous output current settings may be utilized, at 312. In some embodiments, if the adjustment or the adjusted output current is not within acceptable limits, a default output current may be utilized.

When the adjustment of the output current is within acceptable limits for the output current, the method 300 may include adjusting a value of laser current for the next position (e.g. apply during a spacing between the selected sector and the next sector) based on the calculated adjustment, at 314. The adjusted laser current may then be applied at the next position, at 316. At this point, the process 300 can repeat, back to 304, for further adjustments.

In some embodiments, such as a HAMR device, the process 300 can include determining if a spacing of a write element to a disc needs to be adjusted, at 320. When the spacing is determined to need to be adjusted (e.g. by determining a feedback of the write signal is not sufficient), the method 300 may include adjusting the spacing, at 322. When the spacing is determined not needed to be adjusted, the method 300 may repeat the process for further adjustments. In a HAMR device, when a change to the laser power occurs, the method 300 may choose to change a heater value (i.e. clearance) of the write element. This can be done by adjusting the protrusion of the write element, which may be accomplished by changing a writer heater value as described earlier. Additionally, or alternatively, the process 300 may accomplish spacing updates by making adjustments to a read heater element.

In some embodiments, during the process 300, the adjustments or measurements in output current from the power monitor can be stored in a memory bank of registers, such as memory bank 218. This can allow a system, such as controller 106 or 226, to determine trends or changes in laser current over a period of time of multiple adjustments. This could allow a system to change a frequency at which the adjustments are determined or applied. For example, in the HAMR systems, the updates can be modified to occur every sector, every other sector, etc.

Examples of variations of method 300 and other processes described herein are provided in FIGS. 4, 5, 6, and 7.

Figure 4:
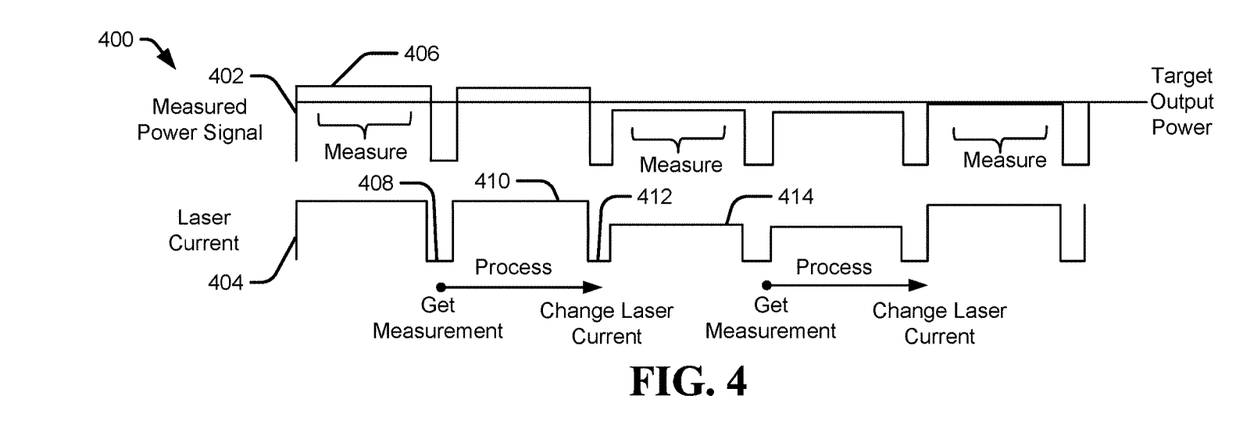
FIG. 4 is a timing diagram of a method of digital automatic power control, in accordance with certain embodiments of the present disclosure.

Referring to FIG. 4, a flowchart of a method of digital automatic power control is shown and generally designated 400, in accordance with certain embodiments of the present disclosure. Generally, the method 400 can be applied by systems 100 or 200, and can be part of the method 300. FIG. 4 shows a measured power signal 402 and a laser current signal 404. The measured power signal 402 may be received by a preamplifier from a power monitor, such as laser power monitor 130, whereas the laser current signal 404 may be a current output of the preamplifier to a laser corresponding to the power monitor.

Method 400 shows a measurement can be taken during time period 406 of the measured power signal while the laser current is being applied. The measurement may be stored in the preamplifier until a time period 408 that the laser current is not applied, which is when a controller can access the preamplifier memory register(s) to retrieve measurement(s). The controller may then, during time period 410, process the measurement(s) and determine an adjustment to make to the laser current to be closer to the target output power of the laser. The controller can then apply the adjustment to the preamplifier during a next time period 412 that the laser current is not applied. The controller can apply the adjustment by programming the preamplifier to output a specific laser current. Then, the adjusted laser current can be applied at the output of the preamplifier at time period 414. This may be referred to as a lagging DAPC.

Other variations of the method 400 can include changing the frequency of the updates so that the controller does not need to access the preamplifier memory between each application of the laser current. For example, the controller may retrieve the measurements after every second or third application of the laser current, which can reduce the amount of bandwidth needed for this process on the communication bus between the controller and the preamplifier. Further, the controller could delay implementing a change until more than one application of the laser current pass.

Figure 5:
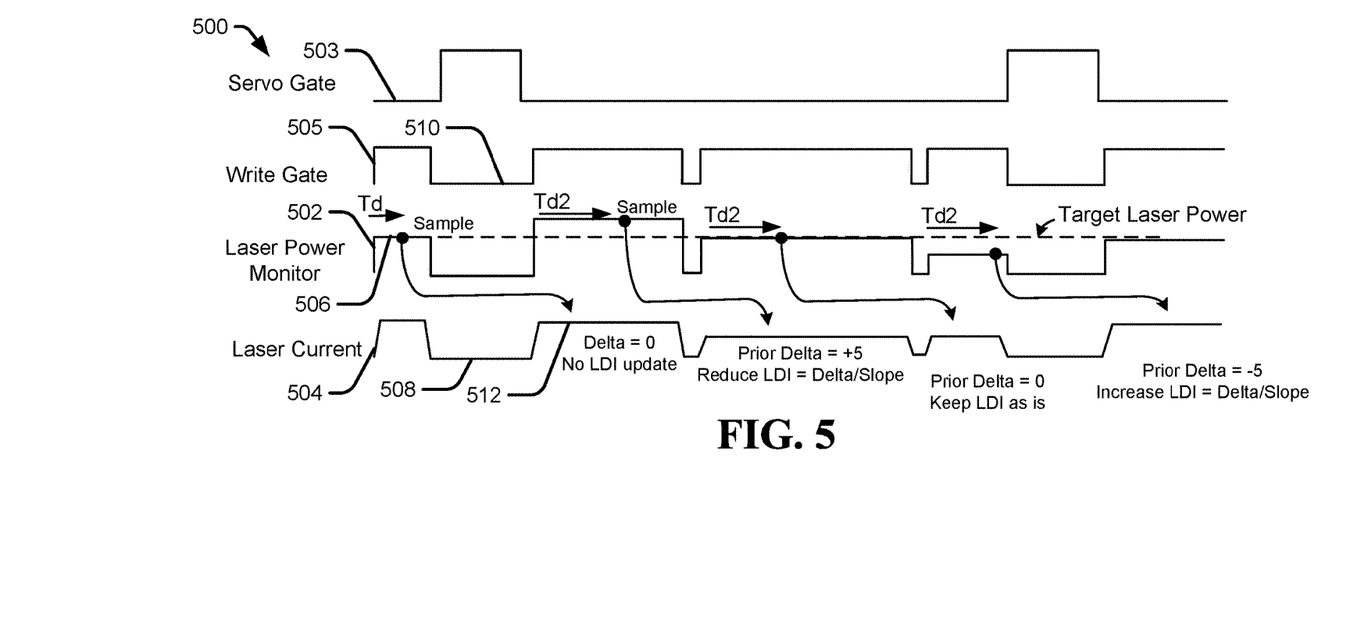
FIG. 5 is a timing diagram of a method of digital automatic power control, in accordance with certain embodiments of the present disclosure.

Referring to FIG. 5, a flowchart of a method of digital automatic power control is shown and generally designated 500, in accordance with certain embodiments of the present disclosure. Generally, the method 500 can be applied by systems 100 or 200, and can be part of the method 300. FIG. 5 shows a measured power signal 502 and a laser current signal 504, as well as servo gate signal 503 and a write gate signal 505. The measured power signal 502 may be received by a preamplifier from a power monitor, such as laser power monitor 130, whereas the laser current signal 504 may be a current output of the preamplifier to a laser corresponding to the power monitor.

Method 500 shows a measurement can be taken during time period 506 of the measured power signal 502 while the laser current 504 is being applied. The measurement may be stored in the preamplifier and an adjustment can be calculated within the preamplifier, such as by DAPC circuit 229. The adjustment can then be applied within the preamplifier to change the laser current (LDI) settings for a next period 512 of application of the laser current. This can occur during a time period 508 that the laser current is not applied. In a HAMR application, the time period 508 may coincide with the write gate not being asserted, as shown at 510, which may be due to the servo gate being asserted as a write element passes over a servo zone of a disc.

This method 500 may be referred to as a fast single sector update as it can allow for the laser current to be updated between every application of the laser current. However, a system can be configured to update less frequently if desired.

Figure 6:
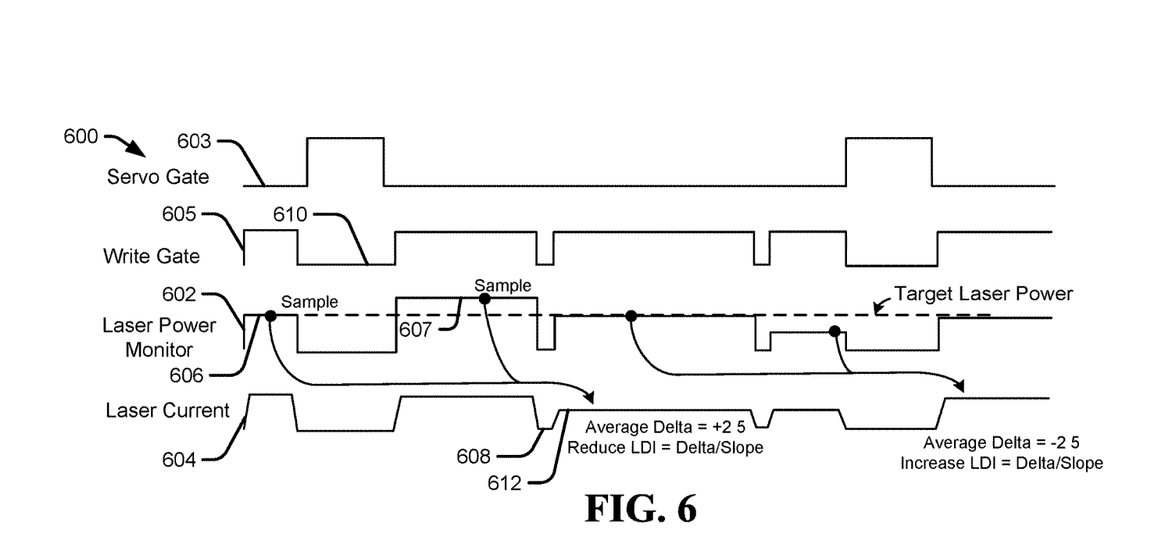
FIG. 6 is a timing diagram of a method of digital automatic power control, in accordance with certain embodiments of the present disclosure.

Referring to FIG. 6, a flowchart of a method of digital automatic power control is shown and generally designated 600, in accordance with certain embodiments of the present disclosure. Generally, the method 600 can be applied by systems 100 or 200, and can be part of the method 300. FIG. 6 shows a measured power signal 602 and a laser current signal 604, as well as servo gate signal 603 and a write gate signal 605. The measured power signal 602 may be received by a preamplifier from a power monitor, such as laser power monitor 130, whereas the laser current signal 604 may be a current output of the preamplifier to a laser corresponding to the power monitor.

Method 600 shows a first measurement can be taken during time period 606 and a second measurement can be taken during time period 607 of the measured power signal 602 while the laser current 604 is being applied. The measurements may be stored in the preamplifier, such as by utilizing a memory bank of registers, and an adjustment can be calculated within the preamplifier based on the multiple samples, such as by DAPC circuit 229. The adjustment can then be applied within the preamplifier to change the laser current settings for a third period 612 of application of the laser current. This can occur during a time period 608 that the laser current is not applied. In a HAMR application, the time period 608 may coincide with the write gate not being asserted, as shown at 610.

This method 600 may be referred to as a 2-$n$ sector average update as it can allow for the laser current to be sampled and averages over multiple applications of the laser current. Variations of this method may include including more samples in the average, such as from a third or more sectors, or from multiple samples within each sector, or any variation thereof.

Figure 7:
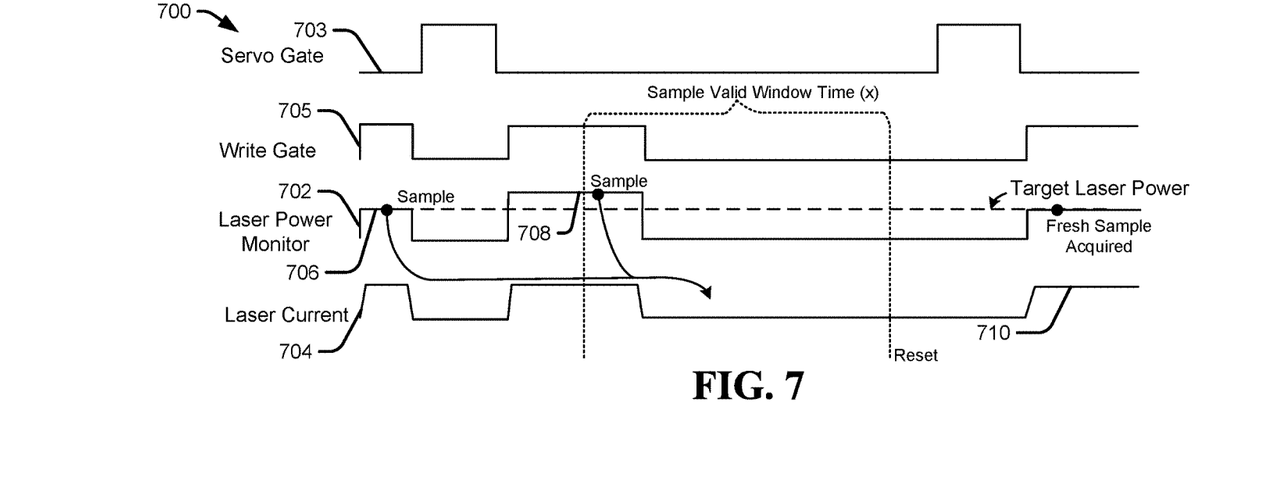
FIG. 7 is a timing diagram of a method of digital automatic power control, in accordance with certain embodiments of the present disclosure.

Referring to FIG. 7, a flowchart of a method of digital automatic power control is shown and generally designated 700, in accordance with certain embodiments of the present disclosure. Generally, the method 700 can be applied by systems 100 or 200, and can be part of the method 300. FIG. 7 shows a measured power signal 702 and a laser current signal 704, as well as servo gate signal 703 and a write gate signal 705. The measured power signal 702 may be received by a preamplifier from a power monitor, such as laser power monitor 130, whereas the laser current signal 704 may be a current output of the preamplifier to a laser corresponding to the power monitor.

Method 700 shows one or more measurements can be taken during time periods 706 and 708 when the laser current is applied. However, if a time period between a last sample received and a next application of the laser current exceeds a time limit, the process 700 may discard the previous sample(s) and not apply an adjustment based on the previous sample(s). At the next application of the laser current 710, the method 700 may utilize a non-adjusted previous laser current and obtain a new sample, or may apply a default laser current. The DAPC process may then continue.

While various examples herein discuss performing method 300 during a write process of a data storage device, the method 300 can be performed during a read mode of a HAMR or optical data storage device. For example, laser power monitoring, digitization of signals, power comparison, and power adjustments may be performed in read mode when the data storage device is performing track seeks. In such examples, a laser power that is adjusted may be laser bias (threshold current) values.

While the above description includes some embodiments that describe data storage device implementations, the present disclosure can be applied to any system that needs to monitor power. For example, the present disclosure can be utilized in any laser system that needs to monitor and adjust output power of the laser. Further, the elements of the different methods and systems described herein may be combined or modified. For example, a HAMR data storage device may utilize a laser voltage reading during read mode while the drive is seeking to a track to help the drive maintain the laser bias value to just above the laser threshold level, which may be the desired laser current level during read mode.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A device comprising:
   a preamplifier circuit including:
      a memory register;
      a first input to receive an analog laser power signal corresponding to a laser during a first period the laser is powered on;
      a data converter circuit configured to convert the analog laser power signal into a digital sample and store the digital sample in the memory register;
   a control circuit configured to:
      retrieve the digital sample from the memory register while the laser is in a first laser off time period;
      determine, during a second period the laser is powered on, an adjustment of a laser current that powers the laser based on the digital sample;
   the preamplifier circuit configured to:
      apply the adjustment to change a power setting of the laser while the laser is in a second laser off time period; and
      operate the laser at the power setting based on the adjustment during a third period the laser is powered on.

2. The device of claim 1 further comprising the control circuit is part of the preamplifier circuit.

3. The device of claim 1 further comprising the control circuit is a circuit separate from the preamplifier circuit.

4. The device of claim 1 further comprising the control circuit is part of a system-on-chip.

5. The device of claim 1 further comprising a laser power monitor circuit configured to generate the analog laser power signal based on an output of the laser.

6. The device of claim 5 further comprising the laser power monitor circuit includes at least one of a photodiode, bolometer, or laser voltage.

7. The device of claim 5 further comprising:
   the laser;
   a write head; and
   a magnetic data storage disc proximate to the laser and the write head such that an area of the magnetic data storage disc is configured to be heated by the laser during a writing state of the write head.

8. The device of claim 1 further comprising the preamplifier circuit configured to receive and store a setting of the laser current and a target laser power.

9. The device of claim 1 further comprising the control circuit configured to determine the adjustment by determining a difference between a target laser power and the digital sample.

10. A device comprising:
    a laser power monitor configured to generate an analog laser power signal based on an output of a laser during a first period the laser is powered on;
    a preamplifier circuit including:
       a first input to receive the analog laser power signal from the laser power monitor;
       a data converter circuit configured to convert the analog laser power signal into a digital sample;
    a control circuit configured to:
       retrieve the digital sample from the preamplifier circuit while the laser is in a first laser off time period;
       determine, during a second period the laser is powered on, an adjustment of a laser current that powers the laser based on the digital sample;
       apply the adjustment to change a power setting of the laser while the laser is in a second laser off time period; and
    the preamplifier circuit configured to operate the laser at the power setting based on the adjustment during a third period the laser is powered on.

11. The device of claim 10 further comprising the control circuit configured to determine if an adjusted laser current based on the adjustment is within an acceptable limit and not apply the adjustment when the adjusted laser current is not within the acceptable limit.

12. The device of claim 11 further comprising the acceptable limit includes a maximum allowable adjustment.

13. The device of claim 11 further comprising the acceptable limit includes a minimum allowable adjustment.

14. The device of claim 10 further comprising the device configured to periodically:
    determine the digital sample;
    determine the adjustment; and
    apply the adjustment while the laser is in an laser off state.

15. The device of claim 10 further comprising:
    the control circuit is a data storage controller.

16. The device of claim 10 further comprising:
    the preamplifier circuit configured to:
       determine the digital sample during a first time period during which the laser is powered on; and
       apply the adjustment to a laser power setting during a second time period which the laser is powered off; and
       utilize an adjusted laser power during a third time period during which the laser is powered on.

17. The device of claim 10 further comprising:
    the preamplifier circuit configured to:
       determine a first digital sample during a first time period the laser is powered on;
       determine a second digital sample during a second time period the laser is powered on;
       determine the adjustment based on the first digital sample and the second digital sample; and
       apply the adjustment to the laser current during a third time period the laser is powered on.

18. The device of claim 10 further comprising:
    the control circuit configured to:
       determine if a time period between samples exceeds a maximum allowable amount of time; and
       discard a last digital sample when the time period exceeds the maximum allowable amount of time; and
       retrieve a new digital sample for a next time period.

19. A method comprising:
    implementing an automatic power control of a laser including:
       obtaining a digital sample from an analog laser power signal from a laser power monitor during a first period the laser is in a powered on state;
       storing the digital sample to a memory;
       retrieving the digital sample from the memory while the laser is in a first powered down period;
       determining an adjustment of a laser current that powers the laser based on the digital sample during a second period the laser is in a powered on state;
       applying the adjustment to the laser current while the laser is in a second powered down period; and utilizing an adjusted laser current, based on the adjustment, during a third period the laser is in a powered on state.

20. The method of claim 19 further comprising:

initializing a target laser power Output and the laser current;

determining the adjustment by:
- obtaining a delta between a digital sample and a target value;
- determine a transfer function between an output of the laser power monitor and the laser current; and
- calculate the adjustment based on the delta and the transfer function.

21. The method of claim 19 further comprising obtaining the digital sample, determining the adjusted laser current, and utilizing the adjusted laser current are performed during a read mode of a disc data storage device.

* * * * *